United States Patent [19]
Gieson

[11] Patent Number: 4,571,141
[45] Date of Patent: Feb. 18, 1986

[54] PALLET UNLOADING FIXTURE
[75] Inventor: Clarence L. Gieson, Proctor, Vt.
[73] Assignee: Metromail Corporation
[21] Appl. No.: 601,962
[22] Filed: Apr. 19, 1984
[51] Int. Cl.[4] .............................................. B66F 9/19
[52] U.S. Cl. ................................... 414/417; 108/52.1;
 108/55.1; 414/608
[58] Field of Search ...................... 414/417, 608, 786;
 108/52.1, 55.1

[56] References Cited
U.S. PATENT DOCUMENTS

| | | | |
|---|---|---|---|
| 2,639,050 | 5/1953 | Hoffman | 414/417 |
| 3,494,490 | 2/1970 | Shell | 414/417 |
| 3,865,250 | 2/1975 | Jay | 108/55.1 X |
| 3,964,623 | 6/1976 | Verhein et al. | 414/417 |

Primary Examiner—Robert G. Sheridan
Attorney, Agent, or Firm—Harvey B. Jacobson

[57] ABSTRACT

A load vertically stacked on a pallet lowered on a lift fork into a vertically elongated handling zone, enclosed by a guide frame. As the pallet approaches a lower rest position, the load is retained above a support plane on top of rails between which the lift fork tines are vertically movable. The lift fork is withdrawn from the unloaded pallet and reinserted into the handling zone just below the load to raise it through the guide frame during which the load is stabilized on the lift fork.

4 Claims, 12 Drawing Figures

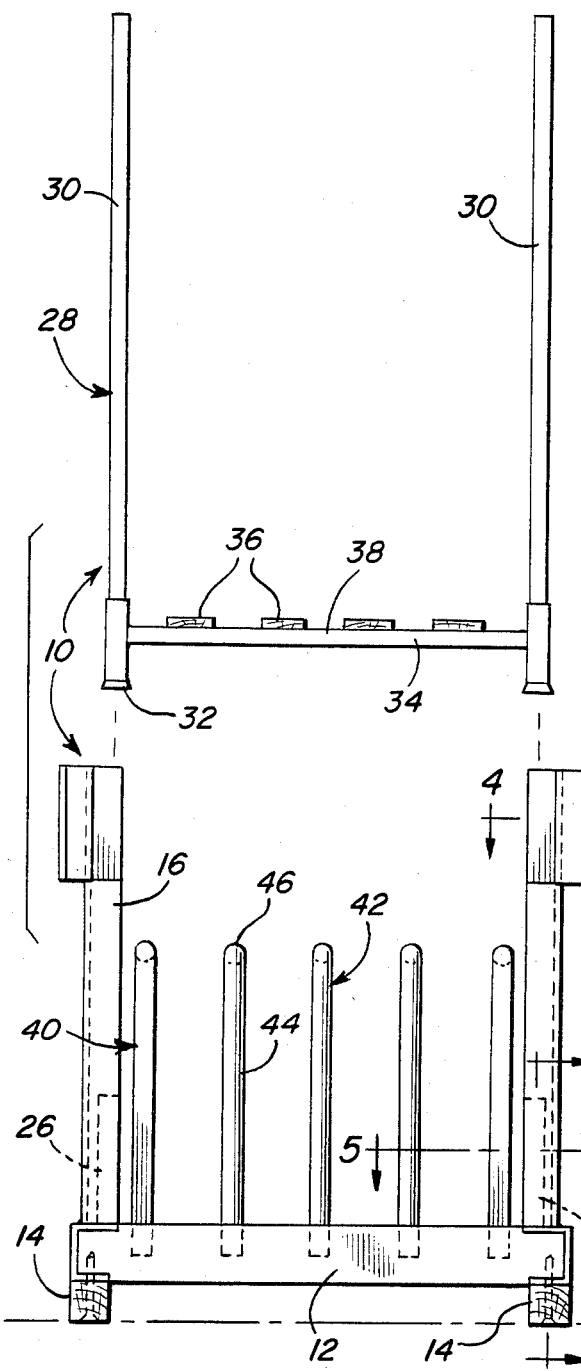
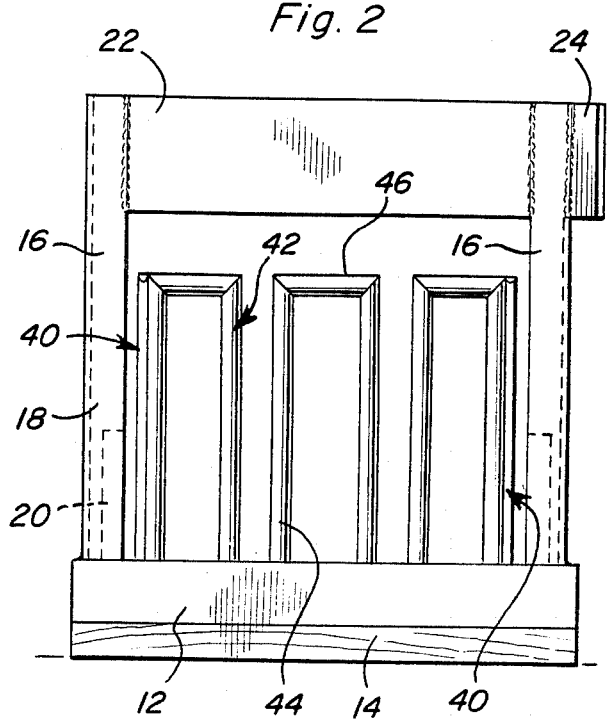
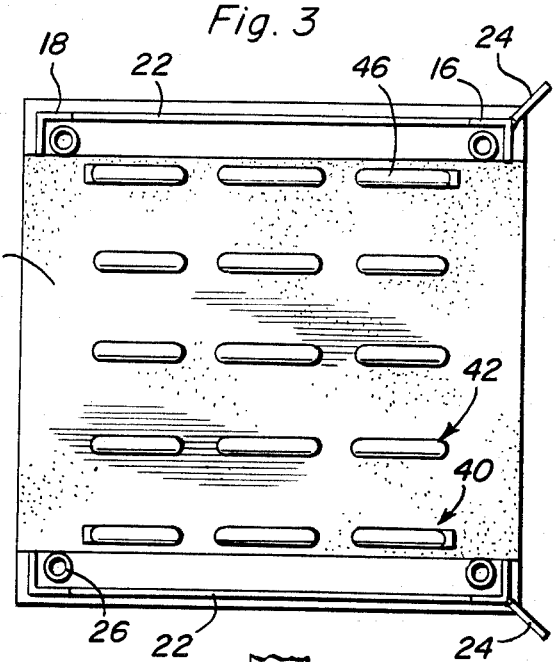
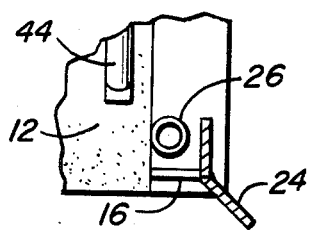
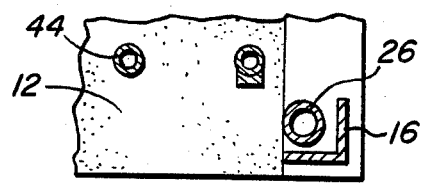
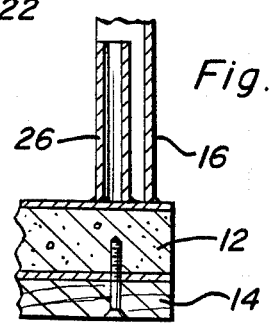

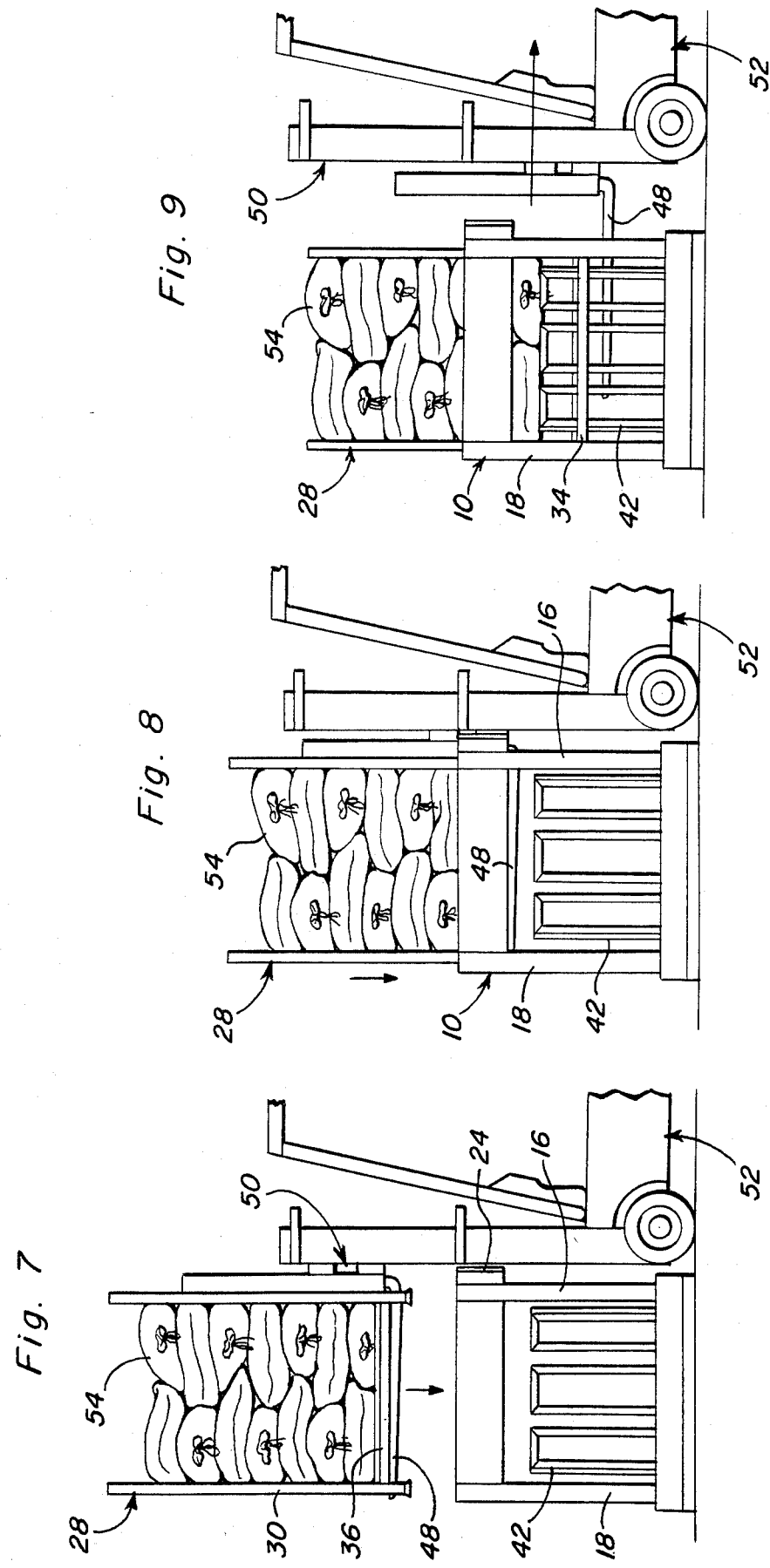

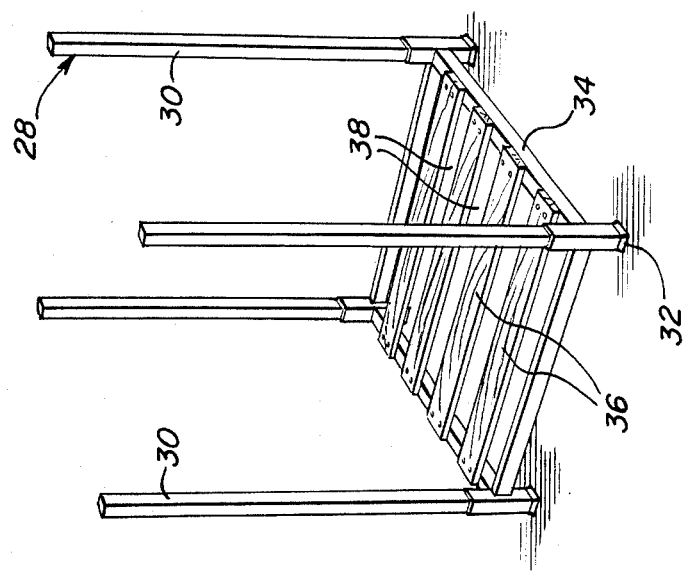
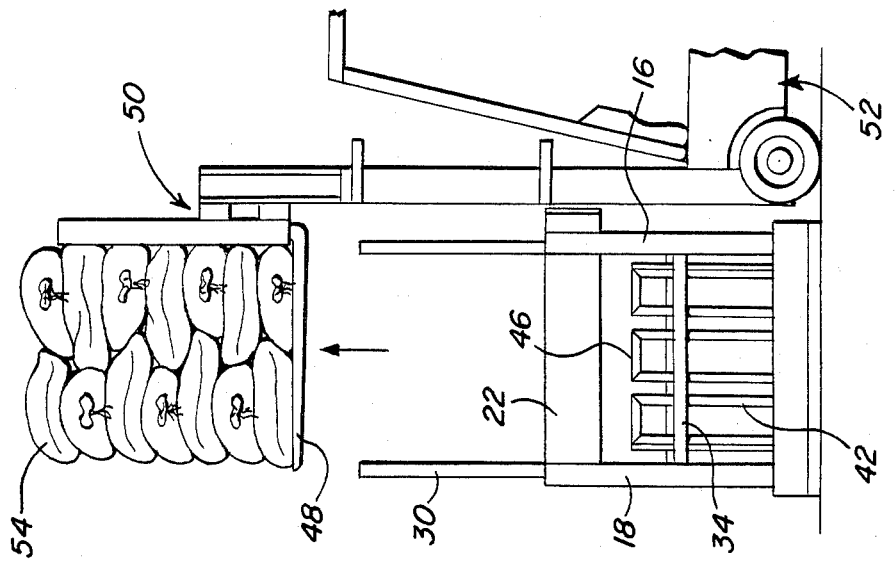
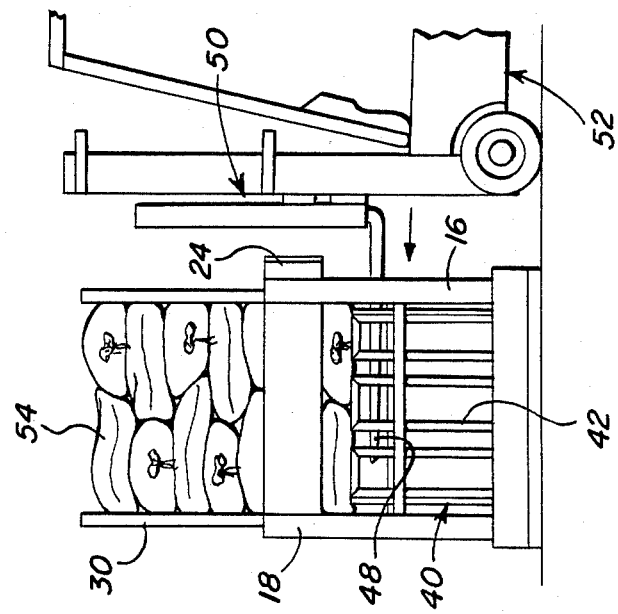

4,571,141

PALLET UNLOADING FIXTURE

BACKGROUND OF THE INVENTION

This invention relates to the handling of palletized loads and more particularly to the unloading of pallets prior to transfer of loads to a desired location.

Vertically stacked loads, such as mail bags, are commonly transported on pallets to a location adjacent an automative van by means of a self-powered, industrial fork lift truck. Prior to loading of such bags into the van, they are unloaded from the pallet. Such pallet unloading heretofore involved time consuming manual transfer operations and tied up use of the industrial truck supporting the loaded pallet during such transfer operations.

In an effort to overcome the foregoing type of problem, it has been proposed in U.S. Pat. No. 2,548,762 to Vossenberg to utilize the fork lift of the industrial truck to separate the load from the pallet by directly lifting the load off the pallet after the loaded pallet is deposited on the ground. Such load handling proposal has not been generally adopted, apparently because of the likelihood of damage to the load by the fork tines that are to be wedgingly inserted between the load and the floor of the pallet with only a relatively thin spacer placed between the load and the pallet. Positioning of the load, free of the pallet, on the fork tines according to the foregoing prior art method requires exceptionally skillful operation of the fork lift truck. Further, positioning of the load on the fork tines is both difficult and unreliable for safe transport where irregular loads, such as mail bags, are involved.

It is therefore an important object of the present invention to provide an improved means and method of separating vertically stacked, irregular loads from pallets on which the loads are transported by fork lift trucks, and transferring the depalletized loads directly onto the fork tines of a conventional fork lift for subsequent transport by short distances to a loading location.

A further object in accordance with the foregoing object is to transfer loads from pallets directly to the lift fork of a conventional industrial truck without manual assistance, without damage to the loads and without use of special pallets and load spacers.

SUMMARY OF THE INVENTION

In accordance with the present invention, a palletized load is guidingly lowered by the fork lift of a conventional industrial truck into a vertically elongated handling zone enclosed by a guide frame fixture having corner guide bars slidably receiving posts secured to the pallet floor on which the load is stacked. In a lower rest position, the pallet is supported on corner stops within the handling zone. During the lowering of the loaded pallet to the rest position, support rails fixed to the base of the guide frame fixture project through gaps between the spaced boards of the pallet floor to engage the bottom of the load and retain the load above a horizontal supporting plane defined by the upper segments of the support rails. The pallet is thereby unloaded so that the lift fork may be horizontally withdrawn from the handling zone. The lift fork is then reinserted fully into the handling zone between the floor of the pallet in the rest position and the load supporting plane and then elevated to engage and raise the load off the supporting plane upwardly through the handling zone. While the load is being raised through the handling zone, it is stabilized on the lift fork tines with the assistance of side plates interconnecting the upper ends of the corner guide bars. Accordingly, after the stabilized load is elevated above the handling zone it may be safely transported on the lift fork, free of the pallet, a relatively short distance to a loading van, for example.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of a guide frame fixture constructed in accordance with the present invention with an unloaded pallet positioned in alignment thereabove.

FIG. 2 is a side elevational view of the guide frame fixture shown in FIG. 1.

FIG. 3 is a top plan view of the guide frame fixture shown in FIG. 2.

FIGS. 4, 5 and 6 are partial sectional views taken substantially through planes indicated by section lines 4—4, 5—5 and 6—6 in FIG. 1.

FIGS. 7-11 are side elevational views illustrating the load handling procedure of the present invention utilizing the guide frame fixture and pallet shown in FIGS. 1-6.

FIG. 12 is a perspective view showing the type of pallet associated with the present invention.

DETAILED DESCRIPTION OF PREFERRED EMBODIMENT

Referring now to the drawings in detail, FIGS. 1, 2 and 3 show a guide frame fixture assembly generally referred to by reference numeral 10. The assembly 10 encloses a vertically elongated handling zone above a base 12 supported on a floor surface by a pair of beams 14. Four corner angle bars 16 and 18 are anchored to the base and are interconnected adjacent the upper ends 20 thereof by side plates 22. The two corner guide bars 16 also frame a front opening into the handling zone from which divergent guide flanges 24 extend welded to the corner bars 16 adjacent the upper ends. The corner bars are embedded in and firmly secured to the base 12 to which stop members 26 are also secured at the corner bars. The upper ends of the stop members define a horizontal plane intersecting the handling zone at which a lower rest position is established for a pallet assembly 28 shown in FIGS. 1 and 12.

The pallet assembly 28 includes four vertical posts 30 having lower foot ends 32 adapted to engage the stop members 26 when the pallet is vertically lowered into the handling zone. The posts 30 are interconnected by side rails 34 and are thereby fixedly spaced so as to be slidably received within the angle guide bars 16 and 18 of the guide frame assembly 10 as the pallet is lowered into the handling zone. The floor of the pallet is formed above the lower ends 32 of the posts by boards 36 secured to the side rails 34 and spaced apart to form gaps 38 therebetween. The gaps 38 are dimensioned to prevent falling of any loads therethrough and are operatively aligned with a load supporting rail system 40 in the guide assembly when the pallet is guided by the corner bars 16 and 18 during vertical lowering of the pallet toward the rest position in the handling zone.

The load supporting rail system as shown in FIGS. 1, 2 and 3 includes four rows of three aligned rail elements 42. The rail elements are generally inverted, U-shaped and made of a tubular rod-like material in the illustrated embodiment. Each element 42 includes parallel spaced legs 44 secured to the base 12 and interconnected at the upper ends by a load supporting segment 46. The rows of rail elements 42 are spaced apart parallel to the side plates 22 so as to project with clearance through the floor gaps 38 of the pallet while it is guidingly lowered to its rest position. The upper segments 46 of the rail elements define a horizontal load supporting plane spaced above the rest position plane established by the stop members 26 so as to unload the pallet as it is being lowered to the rest position for purposes explained hereinafter.

FIG. 7 shows the pallet 28 carried on the tines of a lift fork 48 of a powered lift 50 associated with an industrial truck 52. A load in the form of mail bags 54 is stacked on the floor of the pallet between the posts 30. The truck 52 is operatively maneuvered into alignment between the guide flanges 24 and abutment with the base of the guide frame assembly at its front opening so that the loaded pallet in the elevated position as shown will be aligned with the handling zone therebelow. The loaded pallet is then lowered toward the rest position into the handling zone as shown in FIG. 8. As the pallet approaches the rest position, it is unloaded by retention of the load on the upper segments 46 of the rail elements 42 at the load supporting plane. The lift fork 48 is then withdrawn horizontally from the unloaded pallet as shown in FIG. 9. Once withdrawn, the fork tines are raised somewhat and reinserted horizontally into the handling zone between the rows of rail elements 42 at a level just below the load support plane above which the load is retained as shown in FIG. 10. The lift fork is then raised to engage the load and elevate it above the handling zone as shown in FIG. 11. While being raised through the handling zone in the guide assembly, the load will be stabilized on the lift fork as it passes the side plates 22. The truck 52 may then transport the stabilized load on the lift fork, free of the pallet, to a desired unloading location such as a mail bag transport van.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a pallet having vertical posts, side rails interconnecting said posts and a floor formed by boards secured to the side rails in spaced relation to each other to establish gaps therebetween dimensioned to prevent loads supported on the floor from falling through the gaps, a load handling guide assembly for receiving the pallet supporting the load during transport on a fork lift, comprising a base, elongated guide means secured to the base for reception of the posts of the pallet in vertically slidable relation, stop means mounted in the guide means and engageable by the posts for support of the floor of the pallet in a lowered position above the base, and supporting rail means secured to the base and projecting therefrom through the gaps between the floorboards of the pallet in the lowered position for retention of the load above the floor, said supporting rail means comprising a plurality of rigid rail members secured in spaced relation to each other to the base, said rail members having vertical legs connected to the base and upper load supporting segments interconnecting the legs in alignment with a substantially horizontal supporting plane, spaced above the stop means, on which the load is adapted to rest, said elongated guide means comprising a plurality of corner angle bars having upper ends, side plates interconnecting the corner angle bars adjacent the upper ends thereof in parallel spaced relation to the rigid rail members, and guide flanges secured to two of the corner bars adjacent the upper ends thereof extending in divergent relation to each other.

2. The combination with a pallet supporting a non-rigid, vertically stacked load and mobile fork lift means for transporting the loaded pallet, frame means for enclosing a vertically elongated handling zone, means fixed to the frame means for guiding lowering of the pallet into the handling zone by the fork lift means to a rest position, rail means fixedly mounted by the frame means and projecting through the pallet during said lowering thereof by the fork lift means for establishing a supporting plane, intersecting the handling zone, above which the load is retained, means for guiding elevation of the fork lift means through the handling zone above said supporting plane, and means mounted on the frame means and engageable with the load for stabilizing the load during said elevation of the fork lift means withdrawing the load from the handling zone.

3. The guide assembly as defined in claim 2 wherein said rail means comprises a plurality of rigid rail members secured in spaced relation to each other above the base, said rail members having vertical legs connected to the base and upper load supporting segments interconnecting the legs in substantial alignment with said supporting plane, on which the load is adapted to rest.

4. The combination with a pallet supporting an irregular, vertically stacked load and mobile fork lift means for transporting the loaded pallet, frame means for enclosing a vertically elongated handling zone into which the pallet is guidingly lowered by the fork lift means to a rest position, rail means fixedly mounted by the frame means and projecting through the pallet during said lowering thereof by the fork lift means for retention of the load above a supporting plane intersecting the handling zone, vertical guide means for guiding vertical movement of the pallet through the handling zone, means for establishing gaps in the rail means through which the fork lift means extends horizontally during said vertical movement of the pallet, and means for stabilizing the load during withdrawal from the handling zone by the fork lift means, said fork lift means being horizontally withdrawn from the handling zone and reinserted between the rest position and the supporting plane above which the load is retained on the rail means.

* * * * *